US006721745B2

(12) United States Patent
Monestere, III

(10) Patent No.: US 6,721,745 B2
(45) Date of Patent: Apr. 13, 2004

(54) METHOD AND SYSTEM FOR FACILITATING RETRIEVAL OF REPORT INFORMATION IN A DATA MANAGEMENT SYSTEM

(75) Inventor: Charles Joseph Monestere, III, Albany, NY (US)

(73) Assignee: General Electric Company, Schenectady, NY (US)

(*) Notice: Subject to any disclaimer, the term of this patent is extended or adjusted under 35 U.S.C. 154(b) by 413 days.

(21) Appl. No.: 09/682,332

(22) Filed: Aug. 21, 2001

(65) Prior Publication Data

US 2003/0041044 A1 Feb. 27, 2003

(51) Int. Cl.[7] .............................................. G06F 17/30
(52) U.S. Cl. ........................ 707/10; 707/103 R; 707/3; 707/2; 709/215; 709/216; 709/217
(58) Field of Search ...................... 707/10, 3, 2, 103 R, 707/102, 215, 216, 217, 9, 204, 201, 101

(56) References Cited

U.S. PATENT DOCUMENTS

| | | | | |
|---|---|---|---|---|
| 5,581,749 A | * | 12/1996 | Hossain et al. | 707/10 |
| 5,606,693 A | * | 2/1997 | Nilsen et al. | 707/10 |
| 5,613,106 A | * | 3/1997 | Thurman et al. | 707/204 |
| 5,613,110 A | | 3/1997 | Stuart | |
| 5,664,182 A | | 9/1997 | Nierenberg et al. | |
| 5,668,986 A | * | 9/1997 | Nilsen et al. | 707/10 |
| 5,721,903 A | | 2/1998 | Anand et al. | |
| 6,081,810 A | | 6/2000 | Rosenzweig et al. | |
| 6,199,058 B1 | | 3/2001 | Wong et al. | |
| 6,212,524 B1 | * | 4/2001 | Weissman et al. | 707/101 |
| 6,341,286 B1 | | 1/2002 | Kawano | |
| 2002/0143800 A1 | * | 10/2002 | Lindberg et al. | 707/201 |
| 2002/0169775 A1 | * | 11/2002 | Meng | 707/9 |

FOREIGN PATENT DOCUMENTS

WO  WO9818096  * 4/1998  ........... G06F/17/60

OTHER PUBLICATIONS

Karlapalem et al., An Architecture Framework for Homogenizing Heterogeneous Legacy Databases, Sigmod Record, vol. 24, No. 1, Mar. 1995.*
Hammer, Database Description withSDM: a Semantic Database Table, ACM, vol. 6, Sep. 1981, pp. 351–386.*
Grundy, Extending a Persistent Object Framework to Enhance Enterprise Application Server Performance, Australian Computer Society, pp. 57–64.*
Zwol et al. The Webspace Method: On the Integration of Database Technology with Multimedia Retrieval, ACM 2000, pp. 438–445.*
Data Warehouse Methodology, Version 2.1–Level Sep. 1, 1999, pp. 1–10.*

* cited by examiner

Primary Examiner—Frantz Coby
(74) Attorney, Agent, or Firm—Hunton & Williams LLP

(57) ABSTRACT

A method is provided for use in retrieving reports from a report warehouse in a data management system by at least one of a plurality of user processors in communication with a Distributed Component Object Model (DCOM) server. The DCOM server may also be in communication with the report warehouse. The method comprises establishing a mirror database in communication with the DCOM server and extracting an information subset representing data associated with a report stored in the report warehouse. The extracted information subset is then stored in the mirror database. The method further comprises receiving a search request that may include search criteria for searching the information subsets of the mirror database. The mirror database is then searched for information subsets meeting the search criteria. The method also includes the construction of a report list representing the reports from which information subsets meeting the search criteria were derived. The list of reports is provided to the at least one user processor. A report selection is then received from the at least one user processor and the report is retrieved from the report warehouse and downloaded to the at least one user processor.

33 Claims, 3 Drawing Sheets

METHOD AND SYSTEM FOR FACILITATING RETRIEVAL OF REPORT INFORMATION IN A DATA MANAGEMENT SYSTEM

BACKGROUND OF INVENTION

This invention relates to data management systems and more particularly to a data management system that uses a mirror database to facilitate retrieval of information from a large product information database.

Data management systems, often accessible by a large number of local and/or remote clients or users over a distributed network, are becoming increasingly common and are used to maintain and process large amounts of data for use in a wide variety of applications. For example, data management systems may be used to connect clients with product data management (PDM) systems, which may be used to organize and store life cycle data for long-lived equipment or systems. Information relating to stages in the life of a particular item or product may be stored in a PDM system. This information may include design specifications, initial manufacturing data, data on modifications, overhauls and inspections, and other data of interest, all linked to a unique identification code for that item. PDM systems are configured to store such data for a large number of items. Clients may gain access to such information via applications servers effectively coupling the PDM with the end-user.

In some PDM systems, users may extract information for a particular item from a PDM database by specifying the desired information along with a unique identifier for the item of interest. If the unique identifier is not known, the PDM database can be searched using known characteristics of the item of interest. In some instances, it is also possible to extract a particular category of information across multiple similar items to observe trends and relationships.

SUMMARY OF THE INVENTION

Because of the size and complexity of many PDM databases, user-submitted searches based on known item characteristics or other limiting criteria can be highly inefficient and time-consuming. Accordingly, the present invention provides a system that enhances the efficiency and speed of searches performed on a large PDM database while remaining substantially transparent to the user. One aspect of the present invention provides enhanced performance by employing a mirror database that includes for each item being tracked a subset of the information stored in the PDM database. Such a mirror database may be searched more rapidly and efficiently to narrow or limit the overall search. In this manner, the time required to query information by use of the mirror database is substantially reduced when compared to the time associated with querying such information directly from the PDM system.

One particular embodiment of the invention provides a method for retrieving reports from a report warehouse in a data management system by at least one of a plurality of user processors in communication with a Distributed Component Object Model (DCOM) server. The DCOM server may also be in communication with the report warehouse. The method comprises establishing a mirror database that is in communication with the DCOM server and extracting an information subset representing data associated with a report stored in the report warehouse. The extracted information subset is then stored in the mirror database. The method further comprises receiving at the mirror database a search request from a first user on a first user processor that may include search criteria for searching the information subsets of the mirror database. The method also comprises searching the mirror database for information subsets meeting the search criteria and constructing a report list representing the reports from which information subsets meeting the search criteria were derived. The list of reports may then be provided to the at least one user processor. The method also includes receiving a report selection from the at least one user processor. The report selection may identify a set of at least one selected report from the list of reports for downloading from the report warehouse. The at least one report may be retrieved from the report warehouse and downloaded to the at least one user processor.

One aspect of the invention provides a method of retrieving information from a data management system having at least one user processor selectively in communication with a DCOM server. The DCOM server may also be in communication with a report warehouse. The method comprises establishing a mirror database in a mirror data storage device that is selectively in communication with the DCOM server. The mirror database includes an information subset for at least one report stored in the report warehouse, each information subset including information representing at least a portion of the report associated with the information subset. The method further comprises receiving a new report from one of the at least one user processor. The method also comprises submitting the new report to the DCOM server. At least a portion of the new report is extracted to form an information subset of the new report and the information subset of the new report is stored in the mirror database. The new report is submitted to the report warehouse for storage therein. The method further comprises receiving a search request from one of the at least one user processor. The search request includes search criteria for searching the information subsets of the mirror database. The method also includes searching the mirror database for information subsets meeting the search criteria and constructing a list of the reports from which the information subsets meeting the search criteria were derived. The list of reports is then provided to the at least one user processor. The method may comprise the step of receiving a report selection from a user, the report selection identifying a set of at least one report from the list of reports that the user wishes to download from the report warehouse. The set of at least one report is retrieved from the report warehouse and downloaded to the first user processor.

One aspect of the invention provides a data management system for storing and retrieving reports. The data management system may comprise at least one user processor adapted to communicate with a DCOM server and having means for submitting reports to the DCOM server. The system may further comprise a report warehouse having a plurality of reports stored therein and a mirror data base adapted to communicate with the DCOM server and having a plurality of information subsets stored therein. Each information subset may include data representing at least a portion of an associated report stored in the report warehouse. The DCOM server may be adapted to communicate with the report warehouse, the at least one user processor and the mirror database. The DCOM server may be further adapted to receive a new report from the at least one user processor. The DCOM server may include an extraction module adapted to extract at least a portion of data from the new report to form an information subset of the new report. The DCOM server may forward the information subset of the new report to the mirror database for storing therein. The DCOM server may also be configured for requesting a selected report from the report warehouse, receiving the selected report from the warehouse and downloading the selected report to the at least one user processor.

Another aspect of the invention provides a method of creating a mirror database relating to reports stored in a report warehouse of a data management system. The data management system has a plurality of user processors in communication with a DCOM server, the DCOM server being in communication with the report warehouse. The method comprises receiving a report at the DCOM server from one of the report warehouse and the plurality of user processors. The method further comprises extracting an information subset representing data associated with the received report. A communication link between the DCOM server and the mirror database storage device is then established and the extracted information subset is stored at the mirror database storage device to establish a mirror database.

Yet another aspect of the invention provides a data management system comprising at least one user processor having a user interface and means for generating reports. The system further comprises a report warehouse having means for storing data, the report warehouse having a plurality of reports stored therein. The system also comprises a DCOM server having means for communicating with the at least one user processor and the report warehouse. The DCOM server may have means for receiving and transmitting reports. The system may also include extraction means for extracting an information subset from a report, the information subset representing data associated with the report. Also included in the system is a mirror database having means for storing data and being in communication with the DCOM server. The information subset may be stored in the mirror database storing means. The mirror database storing means may have a plurality of information subsets stored therein. Each information subset may include data representing at least a portion of an associated report stored in the report warehouse.

Other objects and advantages of the invention will be apparent to one of ordinary skill in the art upon reviewing the detailed description of the invention.

DETAILED DESCRIPTION OF THE INVENTION

Figure 1:
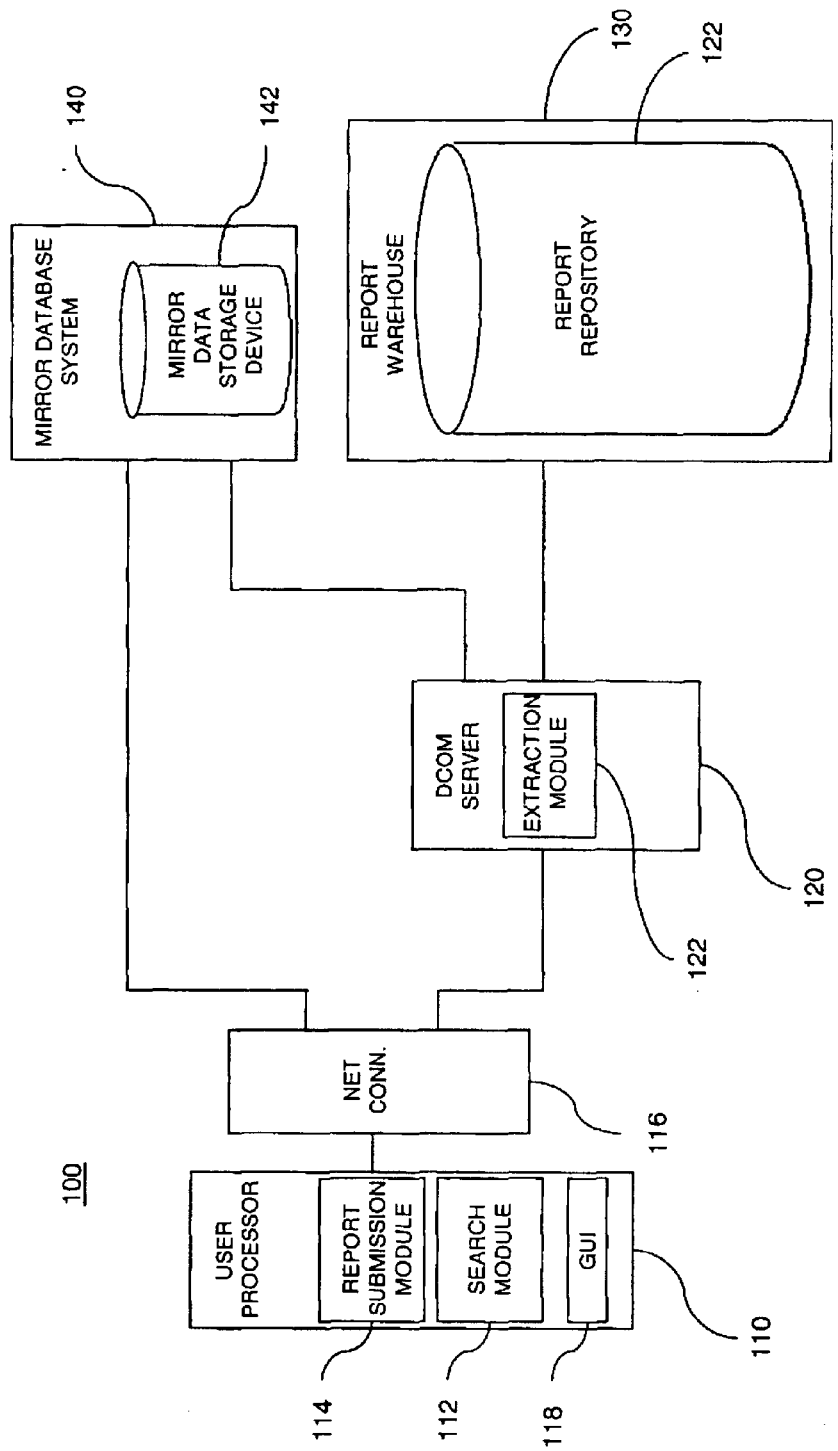
FIG. 1 is a block diagram illustrating a data management system according to an embodiment of the invention.

FIG. 1 is a block diagram illustrating a data management system 100 for storage and retrieval of information relating to a product, product line, system or other item. The system 100 provides for storage and retrieval of such information by a variety of users who may have varying needs or uses for the information. The system 100 may be established, for example, by a manufacturer wishing to maintain information on all examples of a particular product. The clients or users may be local or remote and may be employees of the manufacturer, customers, employees of maintenance concerns, government entities, or any other entity having a need for access to records relating to the product or subject of the data management system. The data may be accessed for business analysis, planning, report generation and other purposes.

In keeping with the embodiment of FIG. 1, the system 100 may comprise one or more user processors 110, a distributed component object model (DCOM) server 120, a report warehouse 130, which may comprise a database or other storage device(s), and a mirror database or storage system 140. Any or all of these system components may be combined to form integrated units or may be separate units interconnected through a network.

As illustrated in FIG. 1, a user may access the resources of the system 100 using a user processor 110 in selective communication with the DCOM server 120 and the mirror database system 140 through the use of a network connection 116. The network connection 116 is preferably a secured network connection, wherein the network may be any distributed network, such as a local area network (LAN), a wide area network (WAN), Internet, Ethernet, etc. The network may include wired and/or wireless components to enable access to and communication among the various system components.

The user processor 110 may include a report submission module 114 that allows the user to upload reports to the data management system 100. The user processor 110 may also include a search module 112 for effecting a search, query or other request. The user processor 110 may also include a graphical user interface (GUI) 118 or other similar interface. The search module 112 also provides an interface with the mirror database system 140. The search module 112 may be programmed or configured to search for reports meeting the search criteria using the mirror database in the mirror database system 140. The search module 112 may be further programmed or configured to construct a list of the reports that meet the criteria and display it to the user using the GUI 118. Using the GUI, the user can then select one or more reports that the user wishes to download. The report or reports may then be requested from the report warehouse 130 through the DCOM server 120.

The system 100 may comprise any number of user processors 110. Each user processor 110 is provided with software configured for facilitating submission and retrieval of data from the data management system 100. This software may include an application used to create, edit, submit, review, approve, retrieve, and view report documents. For example, the FSRAuto tool created by the General Electric Company, the assignee of the present invention, is one tool which may be used in conjunction with the data management system described herein. In one embodiment of the invention, the user software is a Microsoft Visual Basic™ package.

User-supplied information is typically supplied to the system 110 in the form of a report having a predetermined format in which data are entered in identifiable fields. The report or other data is submitted to the DCOM server 120 by the report submission module 114 of the user processor 110. The DCOM server 120 then processes the report and submits it to the report warehouse 130.

The DCOM server 120 includes an extraction module 122 that extracts a copy of the data from predetermined fields of a report prior to submission of the report to the report warehouse 130. These data include at least one report-unique identifier that will allow the report to be discriminated from all other reports in the report warehouse 130. The unique identifier may be a single code or object that is assigned to the report. Alternatively, the unique identifier may comprise information provided in a plurality of fields in the report that when taken in combination uniquely identify the report. The extracted data are stored in a database on the mirror database system 140 for later use in facilitating retrieval of the report from the report warehouse 130. In the alternative, the extraction module may be located at the client/user processor and the extracted data may be communicated directly to the mirror database from the client/user. Also, the extraction module may receive previously stored reports from the report warehouse and extract data from such previously stored reports for uploading to the mirror database.

The mirror database system 140 includes a mirror data storage device 142, which may include or interface to a hard disk, an optical disk, a solid state device or other storage media or components. The mirror database system 140 may be a separate system as shown in FIG. 1 or may be a module within the DCOM server 120. The mirror database system 140 may include or interface with, for example, an Oracle™ relational database such as sold commercially by Oracle Corporation or a Microsoft Access™ database. Other database systems may also be used. The mirror database system 140 is preferably configured and programmed to handle multiple concurrent users. In an alternative arrangement, a mirror file may be set up in an Access database located at the DCOM server and may be accessed directly by a client/user processor 110 to obtain data related to reports stored at the report warehouse. As an example, such data may be used to compile a list of reports stored in the warehouse.

The report warehouse 130 includes at least one report repository 132. The warehouse 130 may involve a PDM system that accepts and stores the reports received from the DCOM server 120. The PDM system may comprise one or more report repositories 132 in the form of data storage units and associated servers for submitting and retrieving data from the data storage units. One example of a PDM system that may be used in embodiments of the present invention is the eMatrix™ platform marketed by MatrixOne, Inc.

Figure 2:
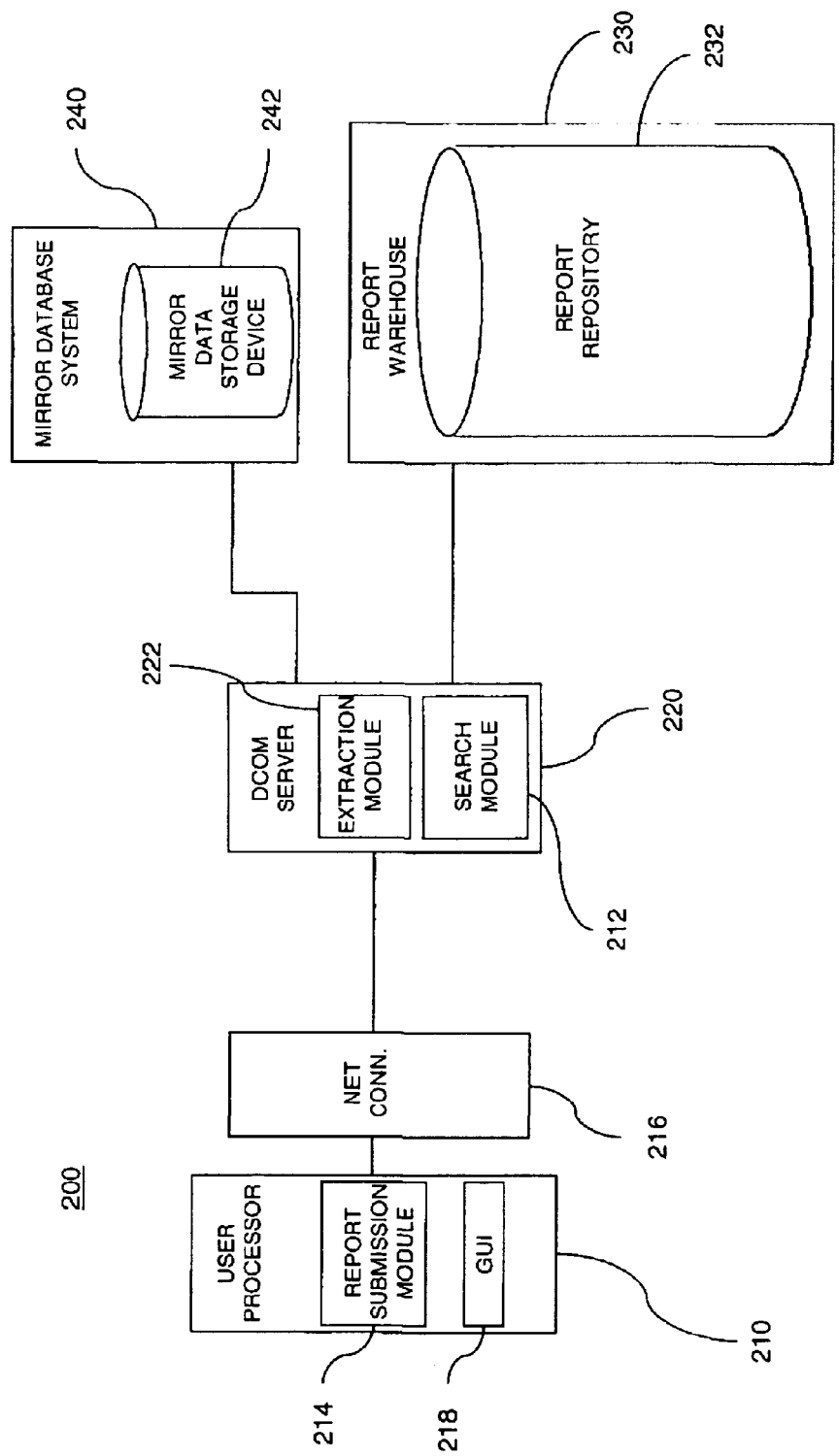
FIG. 2 is a block diagram illustrating a data management system according to another embodiment of the invention.

FIG. 2 is a block diagram illustrating another data management system 200 for storage and retrieval of information relating to a product, product line, system or other item. The system 200 may comprise one or more user processors 210, a DCOM server 220, a report warehouse 230, which may comprise a database or other storage device(s), and a mirror database or storage system 240. Any or all of these system components may be combined to form integrated units or may be separate units interconnected through a network.

A user may access the resources of the system 200 using a user processor 210 in a manner similar to that used in conjunction with the system 100 shown in FIG. 1. The user processor 210 is in selective communication with the DCOM server 220 through the use of a network connection 216. The network connection 216 is preferably a secured network connection, wherein the network may be any distributed network, such as a local area network (LAN), a wide area network (WAN), Internet, Ethernet, etc. The network may include wired and/or wireless components to enable access to and communication among the various system components.

The user processor 210 may include a report submission module 214 that allows the user to upload reports to the data management system 200. The user processor 210 may also include a graphical user interface (GUI) 218 or other similar interface for use in requesting reports or submitting search queries.

The system 200 may comprise any number of user processors 210. Each user processor 210 is provided with software configured for facilitating submission and retrieval of data from the data management system 200. This software may be, for example a Microsoft Visual Basic™ package that could include an application such as FSRAuto for use in creating, editing, submitting, reviewing, approving, retrieving, and viewing report documents.

User-supplied information is typically supplied to the system 210 in the form of a report having a predetermined format in which data are entered in identifiable fields. The report or other data is submitted to the DCOM server 220 by the report submission module 214 of the user processor 210. The DCOM server 220 then processes the report and submits it to the report warehouse 230.

The DCOM server 220 also includes an extraction module 222 that extracts a copy of the data from predetermined fields of a report prior to submission of the report to the report warehouse 230. These data include at least one report-unique identifier that will allow the report to be discriminated from all other reports in the report warehouse 230. The unique identifier may be a single code or object that is assigned to the report. Alternatively, the unique identifier may comprise information provided in a plurality of fields in the report that when taken in combination uniquely identify the report. The extracted data are stored in a database on the mirror database system 240 for later use in facilitating retrieval of the report from the report warehouse 230. The extraction module 222 may also receive previously stored reports from the report warehouse 230 and extract data from such previously stored reports for uploading to the mirror database system 240.

The DCOM server 220 may also include a search module 212 for effecting a search, query or other request. The search module 212 is configured to receive search requests or queries from the user processor 210. The search module 212 may be programmed or configured to search for reports meeting the search criteria using the mirror database in the mirror database system 240. The search module 212 may be further programmed or configured to construct a list of the reports that meet the criteria and return it to the user processor 210 for display to the user using the GUI 218. Using the GUI 218, the user can then select one or more reports that the user wishes to download. The report or reports may then be requested from the report warehouse 130 through the DCOM server 220.

The mirror database system 240 includes a mirror data storage device 242, which may include or interface to a hard disk, an optical disk, a solid state device or other storage media or components. The mirror database system 240 may be a separate system as shown in FIG. 2 or may be a module within the DCOM server 220. The mirror database system 240 may include or interface with, for example, an Oracle™ relational database such as sold commercially by Oracle Corporation or a Microsoft Access™ database. Other database systems may also be used. The mirror database system 240 is preferably configured and programmed to handle multiple concurrent users. In an alternative arrangement, a mirror file may be set up in an Access database located at the DCOM server 220 and may be accessed directly by a client/user processor 210 to obtain data related to reports stored at the report warehouse 230. As an example, such data may be used to compile a list of reports stored in the warehouse 230.

The report warehouse 230 includes at least one report repository 232. The warehouse 230 may involve a PDM system that accepts and stores the reports received from the DCOM server 220. The PDM system may comprise one or more report repositories 232 in the form of data storage units and associated servers for submitting and retrieving data from the data storage units. One example of a PDM system that may be used in embodiments of the present invention is the eMatrix™ platform marketed by MatrixOne, Inc.

Figure 3:
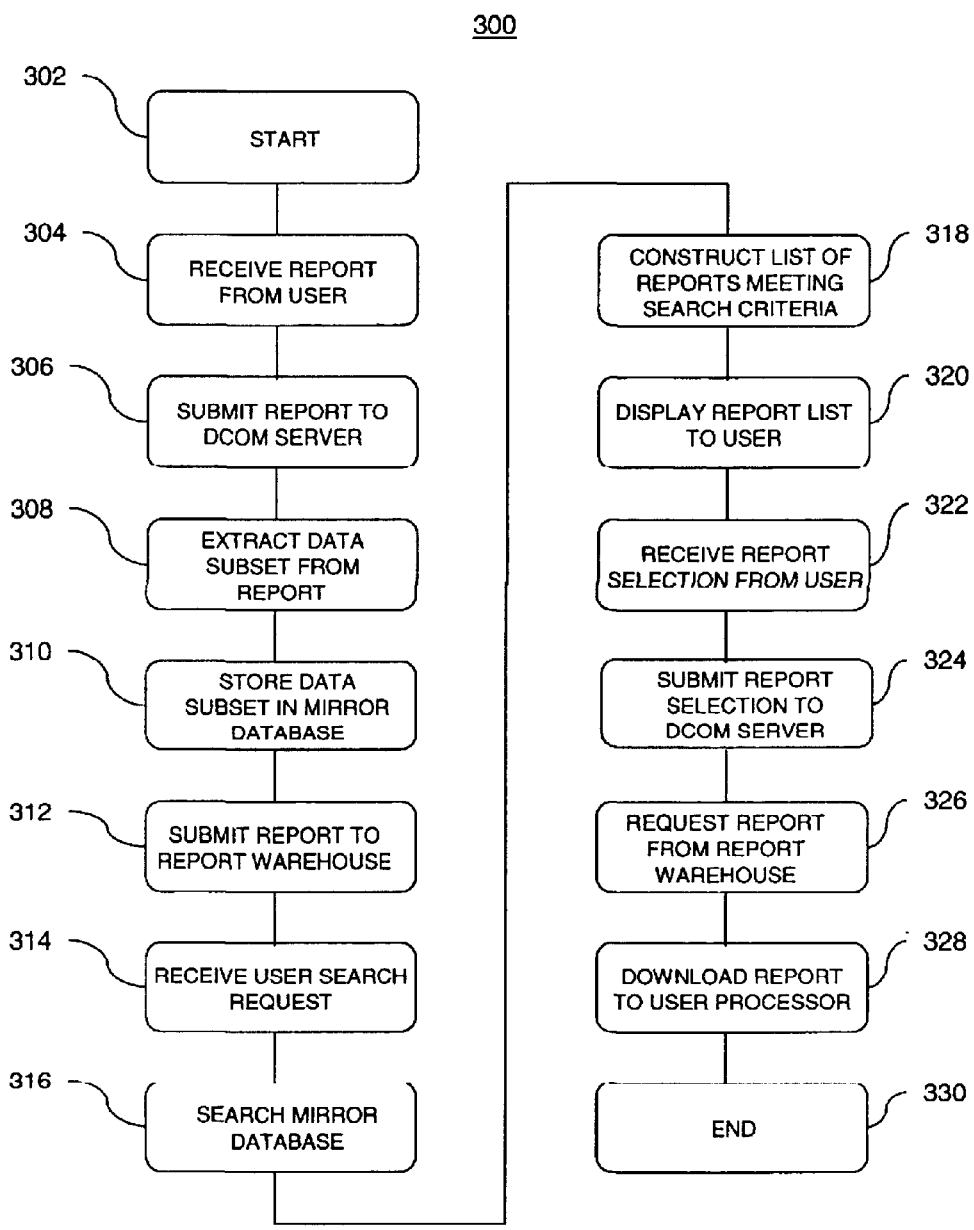
FIG. 3 is a flowchart illustrating steps performed by a process for retrieving a report according to an embodiment of the invention.

The steps performed in a method 300 for processing data according to the invention are illustrated in the flowchart of FIG. 3. The method 300 begins at step 302. In step 304, the system 100, 200 receives a report submitted by a client or user using the report submission module 114, 214 of a user processor 110, 210. The term "report" refers to any collective set or sub-set of information or data or datafile in the data management system or any collective set or sub-set of information or data or datafile submitted by a user for storage in the data management system. Such reports are created by the user off-line in a standard format that includes certain information that define the report, the information being laid out in predetermined searchable fields. Such information might include the date of the report, the date of a particular action such as an inspection, name of the report generator, serial number of the equipment involved or any other information that would serve to discriminate the report from other similar reports. After the report has been prepared, the user may log into the system 100, 200 using the user processor 110, 210 and upload the report.

In step 306, the report is submitted to the DCOM server 120, 220 using the report submission module 114, 214. The extraction module 122, 222 of the DCOM server 120, 220 finds and extracts a portion of the data from the report in step 308. It will be understood by those having ordinary skill in the art that, as used herein, the terms extract and extracted relate to either removal of data from a report or the copying of data from a report. The extracted portion includes standard information selected to facilitate retrieval of the report. The DCOM server 120, 220 may assign a report-unique identifier that may be used to extract the report from the report warehouse 130, 230. Alternatively, such an identifier can be assigned by the user and included in the information fields extracted by the DCOM server 120, 220. As previously noted, the unique identifier may be a single code or may comprise a combination of information from multiple fields in the report. Whether assigned by the DCOM server 120, 220 or generated by the user, the report-unique identifier is stored along with the other extracted data in a mirror dataset in the mirror dataset system 140, 240 in step 310. In step 312, the DCOM server 120, 220 submits the report to the report warehouse 130, 230, which stores the report in a PDM data repository.

Steps 302 to 312 may be repeated for any number of reports to establish a report database and an associated mirror database. The reports may be received from one or more users and from one or more user processors 110, 210. It will be understood by those of ordinary skill in the art that pre-existing report databases can also be used to establish an associated mirror database. In such a case, steps 302 to 312 may be carried out during and after the establishment of the mirror database from the pre-existing report database.

At step 314, the system 100, 200 receives a search request from a user via the search module 112, 212. In the system 100 of FIG. 1, the search module 112 resides on the user processor 110. In the system 200 of FIG. 2, the search module 212 resides on the DCOM server. The search request includes a set of one or more search criteria that can be used to identify the report or reports of possible interest to the user. For example, the user could submit a request to see a list of all inspection reports for a piece of equipment having a certain serial number or the user could request to see all inspection reports for inspections conducted on a certain type of equipment during a particular time interval. The number and type of search criteria are virtually unlimited.

At step 316, the search module 112, 212 uses the search criteria of the search request to search the mirror database in the mirror database system 140, 240.

Using the data subsets stored in the mirror database, the search module 112, 212 compiles at step 318 a search result list of the reports in the report warehouse 130, 230 that meet the search criteria. If the system 200 of FIG. 2 is being used, the search result list is then sent to the user processor 210 from the DCOM server 220. The search result list may then be displayed for the user using the GUI 118, 218 or other output device at step 320.

At step 322, the system 100, 200 receives a report selection from the user through the user processor 110, 210. At step 324, the report selection is transmitted from the user processor 110, 210 to the DCOM server 120, 220, which then submits the request to the data warehouse 130, 230 at step 326. At step 328, the requested report is downloaded from the report warehouse 130, 230 to the user processor 110, 210 through the DCOM server 120, 220. The process ends at step 330.

The methods and systems of the present invention have been shown to significantly enhance the performance of the report retrieval process. In one report system using an eMatrix™ database, query times were reduced from a range of 1.5 to 5 minutes to a range of 5 to 15 seconds by switching from direct searching to mirror database searching. In addition, the switch was accomplished with virtually no change to the user interface on the user processor.

Other embodiments and uses of the invention will be apparent to those skilled in the art from consideration of the specification and practice of the invention disclosed herein. The specification and examples should be considered exemplary only. The scope of the invention is limited only by the claims appended hereto.

What is claimed is:

1. In a data management system having a report warehouse and a plurality of user processors in communication with a DCOM server, the DCOM server being in communication with the report warehouse, a method of retrieving reports from the report warehouse by at least one user processor of the plurality of user processors, the method comprising:

establishing a mirror database, the mirror database being in communication with the DCOM server;

extracting an information subset representing data associated with a report stored in the report warehouse;

storing the extracted information subset at the mirror database;

receiving at the mirror database a search request including search criteria for searching information subsets stored in the mirror database;

searching the mirror database for information subsets meeting the search criteria;

constructing a report list representing the reports from which information subsets meeting the search criteria were derived;

providing the report list to the at least one user processor;

receiving a report selection from the at least one user processor, the report selection identifying at least one selected report from the report list for downloading from the report warehouse;

retrieving the at least one selected report from the report warehouse; and downloading the at least one selected report to the at least one user processor.

2. A method according to claim 1 wherein the mirror database is part of the DCOM server.

3. A method according to claim 1 wherein the DCOM server performs the step of extracting the information subset from the report.

4. A method according to claim 3 further comprising the step of uploading at least one report from the at least one user processor, and wherein the DCOM server extracts an information subset from each of the at least one uploaded report, communicates each extracted information subset to the mirror database for storing therein, and communicates the at least one uploaded report to the report warehouse for storing therein.

5. A method according to claim 1 wherein the report warehouse includes a product data management system.

6. A method according to claim 1 wherein the at least one user processor includes a graphical user interface and the step of providing the report list includes the step of displaying the report list via the graphical user interface.

7. A method according to claim 1 further comprising the step of uploading by the at least one user processor the report of the extracting step to the DCOM server, which uploads the report to the report warehouse, and wherein the step of extracting the information subset is performed by the at least one user processor, which communicates the extracted information subset directly to the mirror database for storing therein.

8. A method of retrieving information from a data management system having at least one user processor selectively in communication with a DCOM server, the DCOM server being in communication with a report warehouse, the method comprising:

establishing a mirror database in a mirror data storage device that is selectively in communication with the DCOM server, the mirror database including an information subset for at least one report stored in the report warehouse, each information subset including information representing at least a portion of the report associated with the information subset;

receiving a new report from one of the at least one user processor;

submitting the new report to the DCOM server;

extracting at least a portion of the new report to form an information subset of the new report;

storing the information subset of the new report in the mirror database;

submitting the new report to the report warehouse for storage therein;

receiving a search request from one of the at least one user processor, the search request including search criteria for searching the information subsets of the mirror database;

searching the mirror database for information subsets meeting the search criteria;

constructing a list of the reports from which the information subsets that meet the search criteria were derived; and providing the list of reports to the one of the at least one user processor that generated the search request.

9. A method according to claim 8 further comprising:

receiving a report selection from a user, the report selection identifying a set of at least one report from the list of reports that the user wishes to download from the report warehouse;

retrieving the set of at least one report from the report warehouse; and downloading the set of at least one report to the first user processor.

10. A data management system for storing and retrieving reports, the system comprising:

at least one user processor adapted to communicate with a DCOM server and having means for submitting reports to the DCOM server;

a report warehouse having a plurality of reports stored therein;

a mirror database adapted to communicate with the DCOM server and having a plurality of information subsets stored therein, each information subset including data representing at least a portion of an associated report stored in the report warehouse; and the DCOM server adapted to communicate with the report warehouse, the at least one user processor and the mirror database, the DCOM server further adapted to receive a new report from the at least one user processor, the DCOM server comprising an extraction module adapted to extract data from the new report to form an information subset of the new report, the DCOM server forwarding the information subset of the new report to the mirror database for storing therein.

11. A data management system according to claim 10 wherein the DCOM server forwards a request for a selected report to the report warehouse, receives the selected report from the report warehouse and transmits the selected report to the at least one user processor.

12. A data management system according to claim 10 wherein the at least one user processor, the DCOM server, and the report warehouse are selectively connected through a network.

13. A data management system according to claim 12 wherein the mirror database is in selective communication with the at least one user processor and the DCOM server through the network.

14. A data management system according to claim 10 wherein the mirror database is integral with the DCOM server.

15. A data management system according to claim 10 wherein the at least one user processor includes a search module adapted to issue a search request including search criteria to the mirror database and to construct a list of reports stored in the mirror database that meet the search criteria.

16. A data management system according to claim 10 wherein the DCOM server includes a search module adapted to issue a search request including search criteria to the mirror database and to construct a list of reports stored in the mirror database that meet the search criteria.

17. A data management system according to claim 10 wherein the at least one user processor includes means for displaying the list of reports and means for receiving a user selection from the list, the at least one user processor adapted to submit the user selection as a report request to the DCOM server.

18. A data management system according to claim 10 wherein the report warehouse includes a product data management system for managing the storage and retrieval of reports.

19. In a data management system having a report warehouse and a plurality of user processors in communication with a DCOM server, the DCOM server being in communication with the report warehouse, a method of creating a mirror database relating to reports stored in the report warehouse, the method comprising:

receiving a report at the DCOM server from one of the report warehouse and the plurality of user processors;

extracting an information subset representing data associated with the received report;

establishing a communication link between the DCOM server and the mirror database storage device; and storing the extracted information subset at the mirror database storage device to establish a mirror database.

20. The method of claim 19, further comprising the steps of:

receiving a search request from at least one of the plurality of user processors, the search request including search criteria for searching information subsets stored in the mirror database; and searching the mirror database for information subsets meeting the search criteria.

21. The method of claim 20 wherein the user processor is in selective communication with the mirror database and the step of searching the mirror database is accomplished using a search module included in the user processor.

22. The method of claim 20 wherein the step of searching the mirror database is accomplished using a search module included in the DCOM server.

23. The method of claim 20, further comprising the steps of:

constructing a report list representing the reports from which information subsets meeting the search criteria were derived; and providing the report list to the at least one of the plurality of user processors.

24. The method of claim 20, further comprising the steps of:

generating a report selection from the at least one of the plurality of user processors, the report selection identifying at least one selected report from the report list for downloading from the report warehouse;

retrieving the at least one selected report from the report warehouse; and downloading the at least one selected report to the at least one of the plurality of user processors.

25. A data management system comprising:

at least one user processor having a user interface and having means for generating reports;

a report warehouse having means for storing data, the report warehouse having a plurality of reports stored therein;

a DCOM server having means for communicating with the at least one user processor and the report warehouse, the DCOM server having means for receiving and transmitting reports;

an extraction means for extracting an information subset from a report, the information subset representing data associated with the report;

a mirror database having means for storing data and being in communication with the DCOM server;

the information subset being stored in the mirror database storage means; and the mirror database storage means having a plurality of information subsets stored therein, each information subset including data representing at least a portion of an associated report stored in the report warehouse.

26. The data management system of claim 25 wherein the extraction means is integral with at least one of the DCOM server and the at least one user processor.

27. The data management system of claim 25 wherein the at least one user processor includes a report submission module for generating a report and submitting the report to the DCOM server.

28. The data management system of claim 25 wherein the extraction means is integral with the at least one user processor, which delivers the information subset directly to the mirror database.

29. The data management system of claim 25 wherein the at least one user processor is in selective communication with the mirror database and includes a search module adapted to generate a search query and transmit the search query to the mirror database, the search module generating a list of reports representing the information subsets responsive to the search query.

30. The data management system of claim 25 wherein the DCOM server includes a search module adapted to generate a search query and transmit the search query to the mirror database, the search module generating a list of reports representing the information subsets responsive to the search query and transmitting the report list to the at least one user processor.

31. The data management system of claim 25 wherein via the user interface, a user of the at least one user processor views the report list and selects at least one report to be retrieved from the report warehouse.

32. The data management system of claim 31 wherein the at least one user processor transmits to the DCOM server a request for the at least one selected report, the DCOM server communicating with the report warehouse to obtain data associated with the at least one selected report stored in the report warehouse and delivering the data associated with the at least one selected report to the at least one user processor.

33. The data management system of claim 25 wherein the at least one user processor, the DCOM server, and the report warehouse are selectively communicatively connected through a network.

* * * * *